(12) United States Patent
Audren

(10) Patent No.: US 6,462,463 B1
(45) Date of Patent: Oct. 8, 2002

(54) ACTUATOR WITH PIEZOELECTRIC CONTROLLED PISTON

(75) Inventor: Jean-Thierry Audren, Saint-Rémy-lès-Chevreuse (FR)

(73) Assignee: Sagem S.A., Paris (FR)

( * ) Notice: Subject to any disclaimer, the term of this patent is extended or adjusted under 35 U.S.C. 154(b) by 0 days.

(21) Appl. No.: 09/869,186

(22) PCT Filed: Oct. 20, 2000

(86) PCT No.: PCT/FR00/02925

§ 371 (c)(1),
(2), (4) Date: Jan. 18, 2002

(87) PCT Pub. No.: WO01/29443

PCT Pub. Date: Apr. 26, 2001

(30) Foreign Application Priority Data

Oct. 21, 1999 (FR) .............................................. 99 13130

(51) Int. Cl.$^7$ ............................................... H01L 41/08
(52) U.S. Cl. ....................................................... 310/328
(58) Field of Search ........................................ 310/328

(56) References Cited

U.S. PATENT DOCUMENTS

| | | | | |
|---|---|---|---|---|
| 3,551,764 A | | 12/1970 | Evans .......................... | 310/328 |
| 4,623,044 A | * | 11/1986 | Ohta et al. ................... | 188/158 |
| 4,971,106 A | * | 11/1990 | Tsutsui et al. ............... | 137/597 |
| 5,281,875 A | * | 1/1994 | Kiesewetter et al. .......... | 310/12 |
| 5,327,041 A | * | 7/1994 | Culp ............................ | 310/328 |

FOREIGN PATENT DOCUMENTS

| | | | | |
|---|---|---|---|---|
| EP | 0 518 262 A | 12/1992 | .......... | H02K/41/00 |
| EP | 0 908 961 A | 4/1999 | .......... | H01L/41/09 |
| FR | 2 702 895 A | 9/1994 | .......... | H02N/2/00 |
| JP | 63-3664 | * 1/1988 | .......... | H02N/2/00 |
| JP | 2001-298970 | * 10/2001 | .......... | H02N/2/00 |

OTHER PUBLICATIONS

Patent Abstracts of Japan; vol. 017, No. 083 (M–1369), Feb. 18, 1993 & JP 04 282035 A (Aisin Seiki Co. Ltd), Oct. 7, 1992; abstract.

* cited by examiner

Primary Examiner—Thomas M. Dougherty
(74) Attorney, Agent, or Firm—Blakely Sokoloff Taylor & Zafman

(57) ABSTRACT

The invention concerns an actuator comprising a sliding sleeve (1) and a piston (2) axially mobile in said sleeve, said piston comprising a plurality of piezoelectric sections made of multilayer material, control means for applying on said sections control voltages for expanding said sections so that they are locked relative to the sliding sleeve and extend other sections inside said sleeve, said expansions and extensions being controlled by said control means according to the sequences moving the piston in said sleeve. The invention is characterised in that the control means are capable of applying to each of the sections a voltage which shortens said section and locks it in the sliding sleeve and an inverse voltage which releases said section relative to said sleeve and extends it therein, one and the other of said voltages being applied successively to said section during a sequence displacing the piston, each section being thus used both for locking and extending during such a sequence.

7 Claims, 4 Drawing Sheets

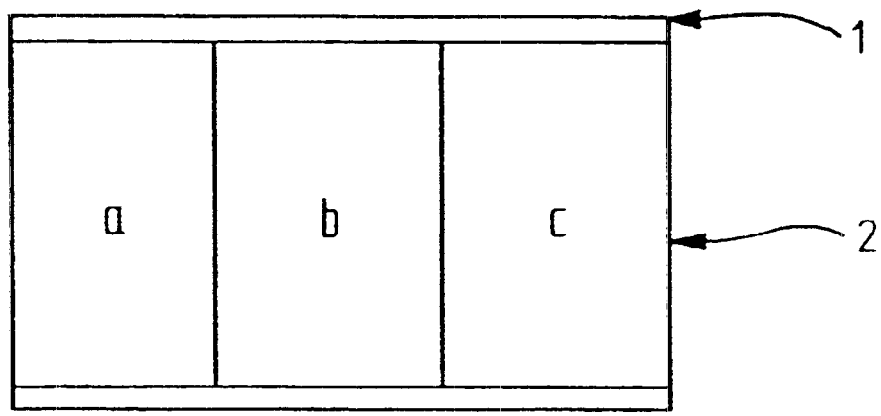
FIG_1
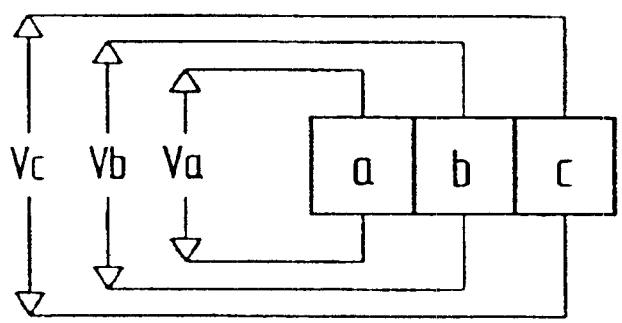
FIG_2

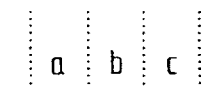
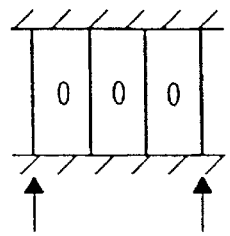
FIG. 3a
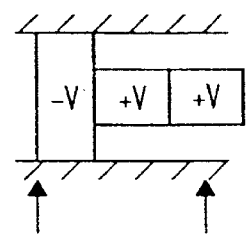
FIG. 3b
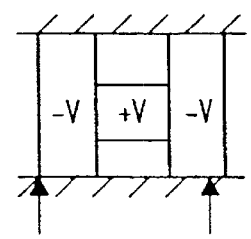
FIG. 3c
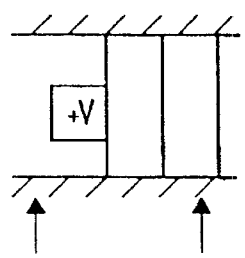
FIG. 3d
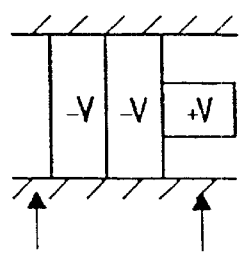
FIG. 3e

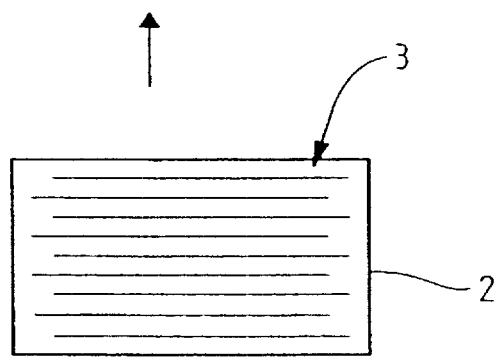
FIG_4
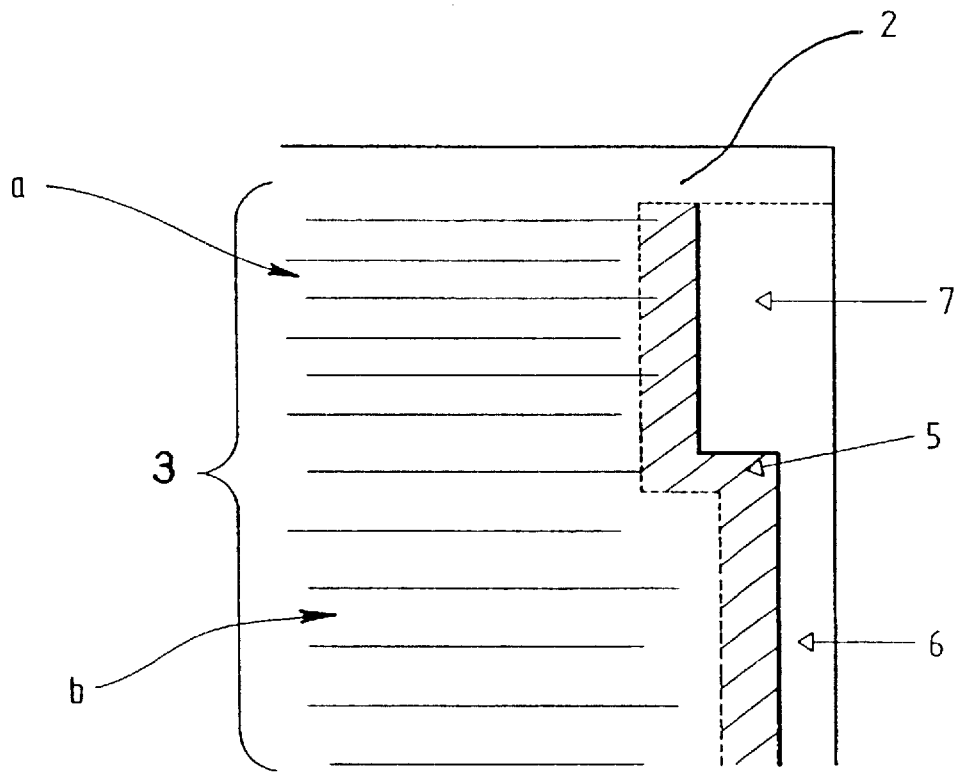
FIG_5

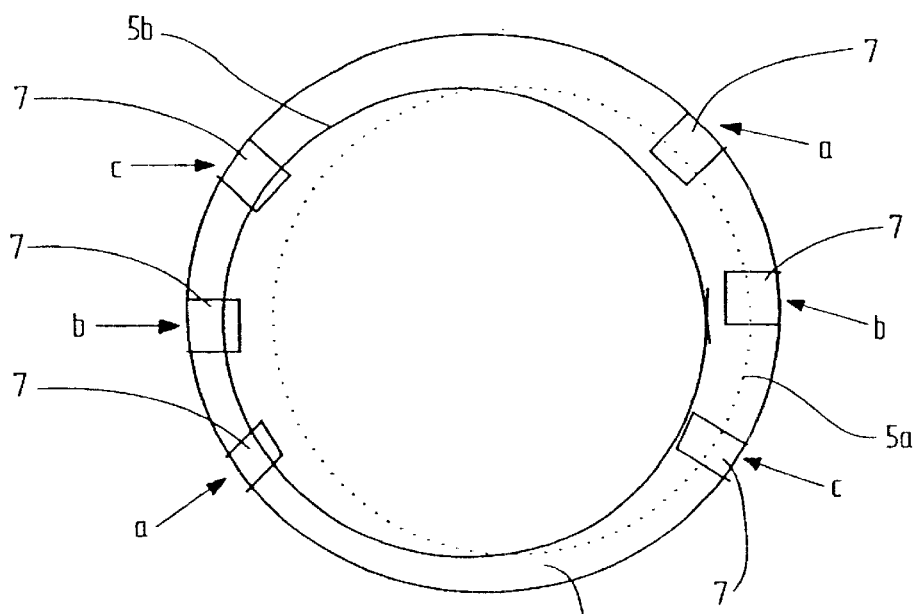
FIG_6
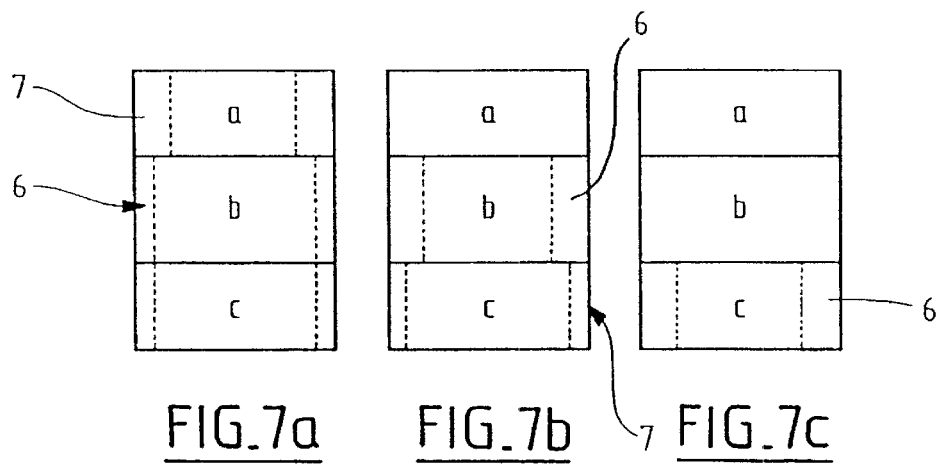
FIG_7a  FIG_7b  FIG_7c
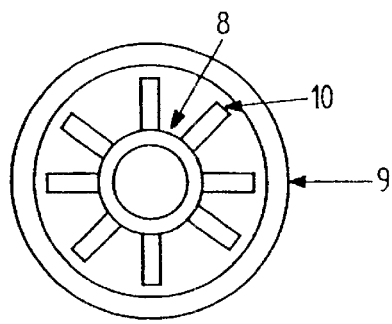
FIG_8

ACTUATOR WITH PIEZOELECTRIC CONTROLLED PISTON

The present invention relates to an actuator having an active piston.

A particularly advantageous application of the invention lies in brake actuators, in particular in the field of aviation.

Generally, presently-known brake actuators are hydraulic type actuators that enable very large forces to be applied, while nevertheless presenting good ability to take up slack due to wear, changes in temperature, etc.

Nevertheless, those actuators present drawbacks associated with the use of a hydraulic fluid: risks of leakage, the need for a pressure generator, etc. . . . .

An object of the invention is to propose an actuator that does not present the drawbacks of hydraulic actuators.

Actuators have already been proposed that comprise a piston constituted by a plurality of successive magnetostrictive segments suitable for being controlled independently of one another.

In this context, reference can be made to the various following patents: U.S. Pat. No. 5,281,875, U.S. Pat. No. 5,317,223, U.S. Pat. No. 5,039,894.

Such actuators require magnetic field generator means to be provided around the piston, which means are complex and particularly bulky.

In particular, for identical volume, they do not enable the same forces to be generated as a hydraulic actuator.

Piezoelectric actuators are also known comprising a guide jacket and a piston suitable for moving axially in said jacket, said piston comprising a plurality of successive segments of multilayer piezoelectric material, said actuator including control means suitable for applying control voltages to said segments to cause the segments to expand in such a manner that they become blocked relative to the guide jacket and to lengthen other segments inside said jacket, these expansions and lengthenings being controlled by said control means in sequences that displace the piston in said jacket.

Such actuators are already described in particular in FR 2 702 895 and in the abstract of Japanese patent JP 60 148 389. They are conventionally constituted by segments, some of which are for expanding perpendicularly to the travel direction of the piston, while the others are for expanding in the travel direction, these various segments being arranged in H-shaped structures.

It will be understood that such structures remain a form of embodiment that is very expensive and complicated.

The invention proposes a piezoelectric actuator structure that is particularly simple.

In particular, the control means of the actuator of the invention are suitable for applying a voltage to each of the segments to shorten said segment and block it in the guide jacket and an opposite voltage which releases said segment relative to said jacket and lengthens it therein, these two voltages being applied in succession to said segment during a piston-displacement sequence, each segment thus being used for blocking purposes and for lengthening purposes during such a sequence.

Such an actuator structure is capable of generating very high pressures (in the range 50 megaPascals (MPa) to 100 MPa) that are of the same order of magnitude as the highest pressures that exist in present-day hydraulic circuits. For equivalent diameters, a piezoelectric piston is capable of generating the same forces as a hydraulic piston.

Such an actuator is advantageously associated with the various following characteristics taken singly or in any technically feasible combination:

a segment presents a plurality of electrodes which extend transversely relative to the axis of the piston, at least one piece of electrical control metallization extending over at least a portion of the height of the piston to a setback in which the metallization is in contact with every other electrode of the segment, the electrodes of the segments being offset in alternation relative to said setback, the metallization in register with segments that it does not feed being offset relative to the setback so that it does not come into contact with the electrodes of said segments;

the piston has a metal case in which the segments are received, control metallization being received in a groove which extends in the height of the piston;

the guide jacket comprises an inner cylinder, an outer cylinder, and an intermediate cylinder, the material of the intermediate cylinder having a coefficient of expansion greater than the coefficients of the inner and outer cylinders;

the intermediate cylinder presents slots extending radially from its inner surface towards its outer surface; and the control means comprise means for causing the segments to deform in a sequence such that initially the piston advances so as to take up the slack which separates it from the surface against which it is to bear, and subsequently it applies a force against said surface.

Other characteristics and advantages of the invention will appear further on reading the following purely illustrative and non-limiting description in association with the accompanying figures, in which:

FIGS. 1 and 2 are diagrams of an actuator constituting a possible embodiment of the invention, and in particular of its piston;

FIGS. 3a to 3e are diagrams showing how the actuator whose piston is shown in FIG. 1 operates;

FIG. 4 is a diagrammatic axial section showing how electrodes are disposed in a piston of an actuator constituting a possible embodiment of the invention;

FIG. 5 is a fragmentary section view showing a detail of the FIG. 4 piston;

FIG. 6 is a diagrammatic elevation view of the FIG. 5 actuator;

FIGS. 7a to 7c show the connections of the various ceramic groups; and

FIG. 8 is a diagrammatic section view of the guide jacket for an actuator constituting a possible embodiment of the invention.

The actuator shown in FIGS. 1 and 2 comprises a guide jacket 1 constituting a cylinder and a piston 2 suitable for sliding axially in said cylinder 1.

The piston 2 is made up of a plurality of segments of piezoelectric ceramic. Specifically, in the example shown in FIGS. 1 and 2 and used in the description below, there are three such segments referenced "a", "b", and "c". Naturally, a larger number of segments could be envisaged.

The various segments are provided with electrodes which enable them to be controlled independently of one another. In FIG. 2, Va, Vb, and Vc represent the control voltages applied to each of the segments "a", "b", and "c".

These segments "a", "b", and "c" can be multilayer ceramic segments or they can be solid ceramic segments. The use of multilayer ceramic segments presents the advantage of making it possible to use small control voltages.

Such a structure operates on the principle shown in FIGS. 3a to 3e.

To take up the slack in a brake mechanism, the piston 2 is moved inside the cylinder 1 by combining the lengthening and the shortening of the material and its striction.

In the description below, it is assumed that each segment lengthens and becomes thinner when the applied voltage is +V, and shortens and becomes fatter when the voltage is −V. In addition, it is assumed that at rest the clearance between the piston 2 and the guide jacket 1 is very small so that as soon as a segment fattens, it is blocked in position, and when it lengthens, it is released.

In FIG. 3a, the piston 2 is shown at rest.

The two arrows in FIG. 3a are reproduced in FIGS. 3b to 3e and serve to show up the progress of the piston 2.

In a first step (FIG. 3b), a voltage −V is applied to the segment "a", while a voltage +V is applied to the other two segments "b" and "c".

Only the segment "a" is then blocked relative to the cylinder 1. The other two segments are lengthened.

In a second step (FIG. 3c), the voltage on segment "c" is reversed, while the voltages on the other two segments "a" and "b" are left unchanged.

The segment "b" is thus maintained in its elongated state and segment "c" becomes blocked in a position to which it has been advanced relative to the position it occupied initially (FIG. 3a).

In a third step (FIG. 3d), the control voltages applied to the segments "a" and "b" are reversed so that the segment "b" becomes blocked relative to the cylinder 1 while being likewise advanced relative to the position it occupied initially (FIG. 3a), while the segment "a" is no longer blocked relative to the guide jacket.

Finally, in a fourth step (FIG. 3e), the control voltage on the segment "a" is reversed so as to return to a position in which the entire piston has advanced relative to its position shown in FIG. 3a.

These four steps can then be repeated until the slack between the piston and the brake mechanism has been taken up.

Once the piston has thus taken up the slack in the brake mechanism, it is held stationary in a position that corresponds to the position shown in FIG. 3b or FIG. 3e. Pressure can then be controlled quickly and finely by controlling Vb and Vc, with Va remaining equal to −V.

By way of example, the segments of the piston 2 can be multilayer cylinders or disks having a diameter of 25 millimeters (mm) and a thickness of 50 mm.

The piston 2 advantageously includes a case E (FIG. 1) which is a thin metal sleeve.

This metal case E presents the advantage of solving problems associated with manufacturing tolerances that are encountered on the piezoelectric segments.

In particular, the piston 2 with its case E can be machined again externally so as to obtain the desired diameter with suitable precision (better than 5 micrometers ($\mu$m) for a diameter of 25 mm).

The case E is selected to have an inside diameter equal to or slightly less than the diameter of the ceramic at rest.

The ceramic is slid into the case E by setting Va=Vb=Vc=+V so as to take advantage of the striction of the various segments.

In a variant or in addition, the case E can be expanded by heating during engagement, which is made possible in particular by the fact that the case E is of thickness that is small compared with the diameter of the piston 2.

The case E can also receive surface treatment for optimizing its coefficient of friction.

Furthermore, as shown in FIGS. 4 to 6, provision is made for the electrodes (referenced 3 in the figures) to remain inside the piston 2 and be powered by metallization 5 extending along grooves 6 formed in the piston 2.

These grooves 6 present a setback 7 running in particular along the entire height of the segment they feed (specifically the segment "a"), which setback 7 extends inwards and in which the metallization 5 comes into contact with the electrodes 3.

Thus, the electrodes 3 are not flush with the outermost surface of the piston 2 but are nevertheless offset in alternation from one side or the other of a diameter of the piston 2, as shown in FIG. 4.

As shown in FIG. 6 and in FIGS. 7a to 7c, the grooves 6 are advantageously distributed in such a manner as to be angularly offset around the piston 2.

They all extend from the same end of the piston 2 in the height thereof, and they terminate level with the setback 7 of the segment they power. In register with the segments that their metallization 5 does not power, the bottoms of these grooves 6 are offset outwards relative to the bottoms of the setbacks 7 so that said metallization 5 does not come into contact with the electrodes 3.

In FIG. 6, two circles 5a and 5b represent the power supply circuits for the various pieces of metallization 5.

It is also known that as a result of a high level of stress, e.g. of the type exerted while braking an aircraft, the temperature of the brakes rises.

This considerable increase in temperature can lead to piezoelectric ceramics becoming depolarized. The temperature at which such depolarization begins can be about 100° C. below the Curie temperature, which gives a temperature of about 130° C. for a soft ceramic and about 230° C. for a hard ceramic.

In order to avoid any risk of depolarization, the electrical control applies a constant voltage that is identical to all of the segments of the piston after braking. This voltage can be higher than the maximum in-use voltage. Its effect is to repolarize the ceramic while the temperature is falling from a high value to ambient.

As will be understood, the embodiments described above assume that the mechanical clearance between the piston 2 and the cylinder 1 in which it slides is, at rest, much smaller than the increase in the diameter of the piston 2 that causes it to become blocked (about 10 $\mu$m in the example described).

It is possible to envisage making adjustments of a few $\mu$m to the clearance at some given temperature (e.g. ambient temperature).

However, it is difficult to conserve this clearance for temperature excursions covering the range −60° C. to +200° C. as can be encountered in brakes. This is due to differential expansion between the piston 2 and the cylinder 1 which can have different thermal expansion coefficients.

High precision pairing is necessary. Unfortunately, it turns out that the piezoelectric ceramics used for the piston have a coefficient of expansion that is very small or even negative. It is therefore not easy to find a material for the cylinder that has an exactly matching coefficient, in particular since the cylinder is required to have other properties such as mechanical strength, machineability, etc.

The guide jacket or cylinder structure shown in FIG. 8 makes it possible to obtain and adjust such matching at the design stage using traditional materials. The device is made up of three materials assembled coaxially.

It comprises an inner cylinder 8 in which the piston 2 slides, an outer cylinder 9, and an intermediate cylinder 10 which extends between the inner cylinder 8 and the outer cylinder 9.

The cylinder 9 prestresses the cylinder 8 and the intermediate cylinder 10 by clamping onto them.

The intermediate cylinder 10 has radial slots 11 which extend from generator lines of the inner cylinder 8. These slots 11 are deep enough to come close to the outside surface of the inner cylinder 8, and they may possibly be open.

The material(s) of the cylinders 8 and 9 is/are selected to have coefficients of expansion that are low, but nevertheless algebraically greater than that of the piston.

The material of the intermediate cylinder 10 is selected to have a greater coefficient of expansion.

When temperature rises, the cylinder 10 expands radially, but it is prevented from so doing to some extent by the cylinder 9 which expands less than it does.

Consequently, the impossible outward expansion is diverted to the cylinder 8 which is compressed radially. The slots 11 have the major role of preventing ortho-radial stresses forming which would prevent the cylinder 10 expanding inwards. In order to ensure that the slots 11 do not corrugate the cylinder 8, the width of said slots is selected to be less than the thickness of said cylinder 8. The expansion of the cylinder 10 constrains the cylinder 9 to expand, and when the cylinder 9 becomes compressed, it stresses the cylinder 8. The relative deformation of the cylinders 8 and 9 is shared pro rata the inverses of their stiffnesses. The thicker and stiffer the cylinder 9, the greater the compression applied on the cylinder 8.

Consequently, the internal expansion coefficient of the cylinder 8 is adjusted by acting on the thickness of the cylinder 9. External machining thus constitutes means for final adjustment of the internal expansion coefficient, it being understood that this coefficient can be varied only towards a greater algebraic value.

Naturally, the term "cylinder" as used in the above description must be understood broadly. It covers, generally, any shape defined by a set of parallel generator lines lying on a common closed surface.

The above-described actuator is advantageously used for fitting to brake calipers, and more particularly to the calipers of airplane brakes.

What is claimed is:

1. An actuator comprising a guide jacket and a piston suitable for moving axially in said jacket, said piston comprising a plurality of successive segments of multilayer piezoelectric material, said-actuator including control means suitable for applying control voltages to said segments to cause the segments to expand in such a manner that they become blocked relative to the guide jacket and to lengthen other segments inside said jacket, these expansions and lengthenings being controlled by said control means in sequences that displace the piston in said jacket, the actuator being characterized in that the control means are suitable for applying a voltage to each of the segments to shorten said segment and block it in the guide jacket and an opposite voltage which releases said segment relative to said jacket and lengthens it therein, these two voltages being applied in succession to said segment during a piston-displacement sequence, each segment thus being used for blocking purposes and for lengthening purposes during such a sequence.

2. An actuator according to claim 1, characterized in that a segment presents a plurality of electrodes which extend transversely relative to the axis of the piston, at least one piece of electrical control metallization extending over at least a portion of the height of the piston to a setback in which the metallization is in contact with every other electrode of the segment, the electrodes of the segments being offset in alternation relative to said setback, the metallization in register with segments that it does not feed being offset relative to the setback so that it does not come into contact with the electrodes of said segments.

3. An actuator according to claim 2, characterized in that the piston has a metal case in which the segments are received, control metallization being received in a groove which extends in the height of the piston.

4. An actuator according to any preceding claim, characterized in that the guide jacket comprises an inner cylinder, an outer cylinder, and an intermediate cylinder, the material of the intermediate cylinder having a coefficient of expansion greater than the coefficients of the inner and outer cylinders.

5. An actuator according to claim 4, characterized in that the intermediate cylinder presents slots extending radially from its inner surface towards its outer surface.

6. An actuator according to claim 1, characterized in that the control means comprise means for causing the segments to deform in a sequence such that initially the piston advances so as to take up the slack which separates it from the surface against which it is to bear, and subsequently it applies a force against said surface.

7. A brake actuator, characterized in that it is constituted by an actuator according to any preceding claim.

\* \* \* \* \*